United States Patent
Schaefer et al.

(10) Patent No.: US 8,802,020 B2
(45) Date of Patent: Aug. 12, 2014

(54) REACTOR FOR PREPARING HYDROGEN CYANIDE BY THE ANDRUSSOW PROCESS

(75) Inventors: Thomas Schaefer, Buettelborn (DE); Robert Weber, Alsbach-Haehnlein (DE); Udo Gropp, Bad Endorf (DE); Thomas Mertz, Bensheim (DE)

(73) Assignee: Evonik Röhm GmbH, Darmstadt (DE)

( * ) Notice: Subject to any disclaimer, the term of this patent is extended or adjusted under 35 U.S.C. 154(b) by 103 days.

(21) Appl. No.: 12/668,957

(22) PCT Filed: May 9, 2008

(86) PCT No.: PCT/EP2008/055730
§ 371 (c)(1),
(2), (4) Date: May 4, 2010

(87) PCT Pub. No.: WO2009/013035
PCT Pub. Date: Jan. 29, 2009

(65) Prior Publication Data
US 2011/0171101 A1     Jul. 14, 2011

(30) Foreign Application Priority Data
Jul. 23, 2007   (DE) ........................ 10 2007 034 715

(51) Int. Cl.
*B01J 8/02*    (2006.01)
*C01C 3/02*    (2006.01)
*B01J 8/00*    (2006.01)
*B01J 12/00*   (2006.01)

(52) U.S. Cl.
CPC ........ *B01J 12/007* (2013.01); *B01J 2208/0053* (2013.01); *B01J 2219/00159* (2013.01); *B01J 8/0285* (2013.01); *C01C 3/0212* (2013.01); *B01J 2208/00884* (2013.01); *C01C 3/0225* (2013.01); *B01J 2208/00194* (2013.01); *B01J 2219/00081* (2013.01); *B01J 2208/00849* (2013.01); *B01J 8/009* (2013.01); *B01J 8/025* (2013.01)
USPC ........... 422/217; 422/220; 422/222; 422/228; 423/376

(58) Field of Classification Search
CPC .... C01C 3/0212; C01C 3/0216; C01C 3/022; C01C 3/0225
USPC .................................................. 423/375, 376
See application file for complete search history.

(56) References Cited

U.S. PATENT DOCUMENTS 1,934,838 A    11/1933   Andrussow et al.
2,387,577 A  * 10/1945   Green .......................... 423/374
(Continued)

FOREIGN PATENT DOCUMENTS

CN    1200102 A    11/1998
CN    1261821 A    8/2000
(Continued)

OTHER PUBLICATIONS

U.S. Appl. No. 12/515,964, filed May 22, 2009, Gropp, et al.
(Continued)

*Primary Examiner* — Jennifer A Leung
(74) *Attorney, Agent, or Firm* — Oblon, Spivak, McClelland, Maier & Neustadt, L.L.P.

(57) ABSTRACT

A reactor for preparing hydrogen cyanide by the Andrussow process is provided. The reactor comprises at least one gas inlet which opens into a gas inlet region, an outlet for the reaction products and a catalyst, wherein at least one mixing element and at least one gas-permeable intermediate layer are within the reactor between the gas inlet region and the catalyst. The mixing element is arranged between the gas inlet region and the gas-permeable intermediate layer. A process for preparing HCN, in the reactor is also provided.

24 Claims, 3 Drawing Sheets

(56) References Cited

U.S. PATENT DOCUMENTS

| | | | |
|---|---|---|---|
| 2,404,574 A * | 7/1946 | Hammond | 422/220 |
| 2,750,266 A * | 6/1956 | Roberts et al. | 422/202 |
| 2,782,107 A | 2/1957 | Inman et al. | |
| 2,893,852 A * | 7/1959 | Montgomery | 422/220 |
| 2,906,604 A | 9/1959 | Kaess et al. | |
| 3,073,685 A * | 1/1963 | Grove, Jr. et al. | 422/221 |
| 3,215,495 A * | 11/1965 | Jenks et al. | 423/376 |
| 3,505,030 A | 4/1970 | Sowards | |
| 3,545,939 A | 12/1970 | Cox, Jr. et al. | |
| 4,128,622 A | 12/1978 | Loos, II et al. | |
| 5,336,656 A | 8/1994 | Campbell | |
| 6,221,327 B1 | 4/2001 | DeCourcy et al. | |
| 2001/0040024 A1* | 11/2001 | Blanda et al. | 165/134.1 |
| 2001/0043902 A1 | 11/2001 | DeCourcy et al. | |
| 2002/0110521 A1* | 8/2002 | Keller et al. | 423/651 |
| 2004/0151663 A1* | 8/2004 | Nougier et al. | 423/648.1 |

FOREIGN PATENT DOCUMENTS

| | | |
|---|---|---|
| CN | 1732040 A | 2/2006 |
| DE | 1 232 934 | 1/1963 |
| DE | 698 05 079 T2 | 11/2002 |
| DE | 699 02 073 T2 | 3/2003 |
| EP | 0 959 042 | 11/1999 |
| EP | 1 001 843 B1 | 4/2002 |
| EP | 0 959 042 B1 | 7/2002 |
| JP | 39-13469 | 7/1964 |
| JP | 2000-26116 A | 1/2000 |
| JP | 2001-56194 A | 2/2001 |
| JP | 2002-510248 A | 4/2002 |
| JP | 2004-224690 A | 8/2004 |
| WO | WO 97/09273 | 3/1997 |
| WO | 99 01212 | 1/1999 |
| WO | WO 2004/041426 A1 | 5/2004 |
| WO | WO 2008105669 A1 * | 9/2008 |

OTHER PUBLICATIONS

U.S. Appl. No. 12/517,673, filed Jun. 4, 2009, Gropp, et al.
U.S. Appl. No. 12/530,836, filed Sep. 11, 2009, Schaefer, et al.
Chinese Office Action issued Jul. 14, 2010 and Chinese Office Action Rejection Decision Dec. 28, 2011, in Chinese Patent Application No. 200710153798.3, filed Sep. 25, 2007 (with English-language Translation).
German Office Action issued May 5, 2008, in German Patent Application No. 102007 034715.6, filed Jul. 23, 2007.
Japanese Office Action issued Oct. 7, 2013 in Patent Application No. 2010-517331 (English Translation only).

* cited by examiner

REACTOR FOR PREPARING HYDROGEN CYANIDE BY THE ANDRUSSOW PROCESS

CROSS REFERENCE TO RELATED APPLICATIONS

This application is the National stage of PCT/EP08/055730, filed May 9, 2008, the disclosure of which is incorporated herein by reference in its entirety. This application claims priority to German Application No. 102007034715.6, filed Jul. 23, 2007, the disclosure of which is incorporated herein by reference in its entirety.

BACKGROUND OF THE INVENTION

The present invention relates to a reactor for preparing hydrogen cyanide (HCN) by the Andrussow process and to a process for preparing HCN which is performed using the inventive reactor.

The synthesis of hydrogen cyanide (HCN) by the Andrussow process is described in Ullmann's Encyclopedia of Industrial Chemistry, Volume 8, VCH Verlagsgesellschaft, Weinheim 1987, page 161-162. The reactant gas mixture, which generally comprises methane or a methane-containing natural gas stream, ammonia and oxygen, is passed through catalyst meshes in a reactor and converted at temperatures of approx. 1000° C. The oxygen needed is typically used in the form of air. the catalyst meshes consist generally of platinum or platinum alloys. The composition of the reactant gas mixture corresponds roughly to the stoichiometry of the exothermic net reaction equation $$CH_4+NH_3+3/2O_2 \rightarrow HCN+3H_2O \quad dHr=-473.9 \text{ kJ}.$$

The reaction gas flowing out comprises the HCN product, unconverted $NH_3$ and $CH_4$, and the essential by-products CO, $H_2$, $H_2O$, $CO_2$ and a large proportion of $N_2$.

The reaction gas is cooled rapidly in a waste heat boiler to approx. 150-200° C. and subsequently passes through a scrubbing column in which the unconverted $NH_3$ is scrubbed out with dilute sulphuric acid and portions of the steam are condensed out. Also known is the absorption of $NH_3$ with sodium hydrogenphosphate solution and subsequent recycling of the ammonia. In a downstream absorption column, HCN is absorbed in cold water and is prepared in a downstream rectification with a purity of greater than 99.5% by mass. The HCN-containing water obtained in the bottom of the column is cooled and recycled to the HCN absorption column.

A broad spectrum of possible embodiments of the Andrussow process is described in DE 549 055. Accordingly, reactors are also known for preparing HCN by the Andrussow process, one example of such a reactor being detailed in EP 1 001 843 B1. These reactors generally comprise an inlet for the reactants, an outlet for the products and a catalyst, which may be configured, for example, in the form of a plurality of platinum meshes arranged in succession. Immediately above the catalyst mesh, a gas-permeable protective layer may be provided, which serves as a heat shield and as a flashback guard.

The processes performed with known reactors already afford good yields with an acceptable energy demand. Owing to the significance of the product, however, there is a permanent effort to improve the performance and the effectiveness of the reactors.

In view of the prior art, it is thus an object of the present invention to provide a reactor which enables a particularly simple and inexpensive preparation of HCN. At the same time, the yield, the production output (kg of HCN/h) and the catalyst lifetime in particular should be increased. In addition, it was consequently an object of the present invention to provide a reactor which enables production of HCN with high HCN concentration in the reaction gas and hence particularly low energy demand in the HCN isolation.

SUMMARY OF THE INVENTION

These objects and further objects which are not stated explicitly but which are immediately derivable or discernable from the connections discussed herein by way of introduction are achieved by a reactor having all features of the present invention according to the claims. Appropriate modifications to the inventive reactor are protected in subclaims. With regard to the process for preparing HCN, the present invention offers a solution to the underlying object.

The present invention accordingly provides a reactor for preparing hydrogen cyanide by the Andrussow process, comprising a reactor vessel, at least one gas inlet which opens into a gas inlet region, an outlet for the reaction products and a catalyst, wherein at least one mixing element and at least one gas-permeable intermediate layer are provided within the reactor vessel between the gas inlet region and the catalyst, the mixing element being arranged between the gas inlet region and the gas-permeable intermediate layer.

As a result of these measures, it is surprisingly possible to provide a reactor which enables a particularly simple and inexpensive preparation of HCN. In addition, the yield and the production output (kg of HCN/h) can be increased by the use of an inventive reactor. Furthermore, HCN can be produced at a particularly low energy demand with an inventive reactor. Moreover, the lifetime of the catalysts can be prolonged by virtue of the construction features of the reactor.

The inventive reactor comprises a reactor vessel into which at least one gas inlet opens. The reactor vessel encloses at least one mixing element, at least one gas-permeable intermediate layer and at least one catalyst. The products are discharged from the reactor vessel through at least one outlet. The shape of the reactor vessel is uncritical per se, such that it may have a rectangular or round cross section. The reactor preferably has a cylindrical shape. The volume of the reactor vessel depends on the intended production output, and the reactor vessel may assume any of the customary volumes. Appropriately, the volume of the reactor vessel may, for example, be in the range of 0.01 $m^3$ to 50 $m^3$. The ratio of height to diameter (H/D) of the reactor vessel may preferably be in the range of 0.4 to 1.8, more preferably 0.6 to 1.4. Appropriately, the reactor vessel, viewed in flow direction of the gas, from the gas-permeable intermediate layer, may have an inner lining of a heat-resistant material. For example, a layer of a ceramic fibre material, for example an Si-containing ceramic fibre material which is obtainable under the trade name Nefalit®, may be provided, which protects the reactor vessel from reaction of heat.

The different reactant gases may be combined upstream of or in the reactor vessel. Accordingly, one, two or more gas inlets may open into the reactor vessel. Within the reactor vessel, the gases are conducted first into a gas inlet region whose volume is uncritical per se.

Between the gas inlet region and the catalyst, according to the present invention, at least one mixing element is provided. According to the embodiment, the gas inlet region may also form part of the mixing element. The mixing element serves to mix the reactant gases supplied, and all known embodiments of gas mixers may be used.

On the basis of a simple and low-maintenance construction, the mixing element may preferably be designed in the form of plate-shaped internals which more preferably comprise a plurality of plate layers. In a preferred aspect of the invention, the mixing element may have three, four, five or more plate layers. These plate layers are preferably arranged essentially in parallel, the angle of the individual plate layers relative to one another being preferably in the range of $-10°$ to $+10°$, more preferably $-5°$ to $+5°$. The plate separation may, for example, be 0.5 cm to 200 cm, preferably 1 cm to 100 cm and most preferably 5 cm to 50 cm. In this case, it is possible, for example, to use perforated plates, in which case the orifices are offset so as to achieve mixing of the gases. Particular preference is given to using impervious plates. In this embodiment, the gas stream can be passed through orifices which are provided at right angles to the plate plane in the plates or between the plates. The particular orifices of the different layers may, based on the particular layer, be provided in an alternating manner in the middle of the reactor vessel, for example in the form of an orifice within the plate, or at the edge of the reactor vessel, i.e. between the particular plate and the wall of the reactor vessel. This construction may preferably be designed as a ring-disc arrangement (disc-donut design), in which case the layers are not connected directly to the reactor vessel, whereas the rings can conclude with the reactor vessel. These arrangements may preferably comprise 2 to 6 discs.

In embodiments which achieve mixing of the gas stream using impervious plates, the number of orifices in the particular layer compared to the embodiments with perforated plates is relatively low. Layers configured in the embodiment with impervious plates preferably have at most 10, preferably at most 5, orifices per $m^2$.

Embodiments which work using perforated plates have more orifices per $m^2$. For example, the perforated plates may comprise at least 11, preferably at least 15 and most preferably at least 20 orifices per $m^2$.

The mixing element preferably comprises impervious plates which have an area which corresponds to at least 40%, more preferably at least 60% and most preferably at least 80% of the cross-sectional reactor area, and more preferably at least 25%, preferably at least 50% and more preferably at least 75% of the plate layers present in the mixing element have such an area. The cross-sectional reactor area arises from the area of the reactor vessel which is measured parallel to the particular plate layer in each case.

The constructions detailed above can preferably result in the formation of a turbulent flow, such that excellent mixing of the gases is achieved.

The reactor vessel and the mixing element may be produced from any materials which withstand the conditions which exist. Suitable materials are especially metals, for example steel. In addition, these components of the reactor may be coated with materials which prevent degradation of the reactant gases, especially of $NH_3$ under the conditions selected. These materials are detailed, inter alia, in U.S. Pat. No. 5,431,984.

According to the invention, a reactor, viewed in the direction of gas flow, downstream of the mixing element, has a gas-permeable intermediate layer. The gas-permeable intermediate layer is preferably configured especially such that it offers flashback protection. In addition, this layer can achieve filtering of the reactant gases, which removes small particles in particular. In addition, the gas-permeable intermediate layer may result in the formation of a pressure difference which leads to particularly uniform flow of the reactant gases towards the catalyst. In this context, the pressure drop may be within a wide range, the inventive advantages being achieved at a relatively high pressure drop, i.e. in the case of formation of a high flow resistance through the gas-permeable intermediate layer in a particularly high degree. On the other hand, in the case of a high flow resistance, a relatively large amount of energy is required to form the intended flow rate of the reactant gases. The person skilled in the art will therefore optimally adjust the pressure difference and the flow resistance caused by the gas-permeable intermediate layer under the given boundary conditions. In this context, a low gas permeability of the intermediate layer leads to a high pressure difference. The gas-permeable intermediate layer may preferably generate a pressure drop which is in the range of 1 to 100 mbar, more preferably 5 to 30 mbar, measured with a U-tube manometer at a flow rate of the reactant gas mixture of 1.5 m/s.

In a preferred aspect, the distance between the gas-permeable intermediate layer and a catalyst configured areally in the reactor may be at least 30 mm, preferably at least 60 mm. More preferably, this distance may be in the range of 40 mm to 1000 mm, most preferably in the range of 60 mm to 100 mm. The gas-permeable intermediate layer is preferably essentially parallel to the area of the catalyst configured areally in the reactor. In this case, the gas-permeable intermediate layer and the catalyst configured areally in the reactor preferably form an angle in the range of $-10°$ to $+10°$, more preferably $-5°$ to $+5°$.

The gas-permeable intermediate layer may be configured, for example, in the form of a nonwoven fabric, woven fabric or foam, and this layer may comprise one or more sheets. The intermediate layer may be formed from any material which withstands the conditions which exist. These include especially metals, for example steel, and inorganic materials such as ceramics or mineral glasses. In a preferred embodiment, the gas-permeable intermediate layer comprises at least one metal mesh arranged in the direction of the catalyst and at least one sheet of glass wool, for example quartz wool, which is provided in the direction of the gas inlet region. The metal mesh arranged in the intermediate layer may preferably have a nominal mesh width in the range of 1 µm to 200 µm, more preferably in the range of 5 µm to 100 µm. The nominal mesh width can be determined, for example, with the known gas bubble test (bubble point test) to ISO standard 4003. The metal mesh may, for example, be configured as a woven fabric or braid, which are formed from metal wire. These include, for example, Dutch weave or twill weave. The thickness of the sheet of glass wool may preferably be in the range of 0.5 cm to 10 cm, more preferably in the range of 1 cm to 5 cm. In this case, the metal meshes and the sheets of glass wool may be enclosed by two perforated metal sheets which have, for example, a hole diameter in the range of 1 mm to 100 mm, more preferably 5 mm to 40 mm.

Once the reactant gases have passed through the gas-permeable intermediate layer, they flow towards a catalyst. The catalysts usable to prepare HCN by the Andrussow process are common knowledge and are detailed, for example, in Ullmann's Encyclopedia of Industrial Chemistry, Volume 8, VCH Verlagsgesellschaft, Weinheim 1987.

In general, the catalysts comprise at least one noble metal, especially a metal of the platinum group. The platinum group includes especially platinum, palladium, iridium, osmium and rhodium, particular preference being given to the use of platinum. These metals may be used individually or as a mixture. For instance, it is possible especially to use alloys which comprise platinum and rhodium.

The catalyst may preferably be configured areally in the reactor, the area more preferably being arranged such that this area is flowed through essentially at right angles by the gas. This flow angle is preferably in the range of 70° to 110° and more preferably in the range of 80° to 100°. The catalyst configured areally may preferably be arranged essentially parallel to the plate-shaped internals which serve to mix the gases. The angle formed by these planes may preferably be in the range of −10° to +10°. These values are based on the plate layer which has the smallest distance from the catalyst layer.

The catalyst configured areally in the reactor may, for example, be provided in the form of meshes, for example wire braids, wire fabrics or grids, perforated metal foils or metal foams. Preference is given especially to using meshes which comprise platinum. It is possible here to use one, two, three, four or more meshes. Preferred embodiments of known catalyst arrangements are described, inter alia, in EP-A-0 680 767, EP-A-1 358 010, WO 02/062466 and WO 01/80988.

The catalyst is generally arranged on a support. This support may, for example, be manufactured from metal or from a ceramic material, preference being given to ceramic materials. These supports are detailed, inter alia, in EP-A-0 680 787, EP-A-1 358 010, EP-A-1 307 401, WO 02/062466 and WO 01/80988.

For example, the catalyst can rest on a support which has been produced from ceramic. The ceramic support may preferably have a multilayer structure, in which case the support comprises an upper ceramic support which is provided in the direction of the catalyst, and a lower ceramic support. The upper ceramic support may, for example, have flow channels with a smaller diameter than the lower ceramic support which is provided in the direction of the outlet of the reaction products. The diameter of the flow channels of the upper ceramic support may, for example, be in the range of 2 mm to 20 mm, preferably 4 mm to 12 mm, whereas the diameter of the flow channels of the lower ceramic support may be in the range of 10 mm to 30 mm, preferably 12 mm to 24 mm. The diameter of the flow channels is a mean value which can be determined by measuring (slide rule) a statistically sufficiently large number of channels and subsequently calculating the mean. The support made of ceramic may especially be produced from $Al_2O_3$ ceramics or aluminium silicate ceramics having an $Al_2O_3$ content greater than 85%. In a particularly appropriate embodiment of the reactor, a metal mesh may be provided between the catalyst and the support made of ceramic, in which case this metal mesh is produced from a material which withstands temperature conditions which exist. This metal mesh may more preferably be produced from steel or a steel alloy, for example from Mat. 1.4767 or Kanthal.

In a further embodiment of the inventive reactor, the catalyst may rest on a support which comprises at least one metallic support mesh which is mounted on a support grid made of metal. The support may preferably comprise one, two, three, four or more metallic support meshes. In this case, the support mesh may, for example, have a mesh width in the range of 1 mm to 50 mm. The support mesh and the support grid may preferably be produced from steel or a steel alloy, for example from Mat. 1.4767 or Kanthal or Inconel 600, Mat. 2.4816, and these materials must be stable under the temperature conditions which exist in each case.

The support grid may be secured on the bottom of the reactor vessel, in which case the support grid may be configured such that the areal catalyst has a distance from the bottom of the reactor vessel provided with orifices in the range from 50 mm to 300 mm.

Appropriately, a layer of a ceramic material may be applied directly on the catalyst. This layer may be present in the form of one or more ceramic fabrics or of a ceramic foam.

The reactor vessel may have a bottom with one or more orifices through which the reaction products can be conducted out of the reactor vessel. In this case, the bottom of the reactor vessel may also be formed by the outlet of the reaction products. In a preferred embodiment of the inventive reactor, the outlet of the reaction products may comprise tube bundles which are configured in the form of heat exchangers. In this case, the tube bundles may be protected from the action of the heat with ceramic elements (ferrules) close to the reactor vessel.

The inventive reactor may comprise further components, especially a component for starting the catalytic reaction. These include especially hydrogen flares, ignition electrodes or the devices detailed in EP-B-1 001 843.

Figure 1:
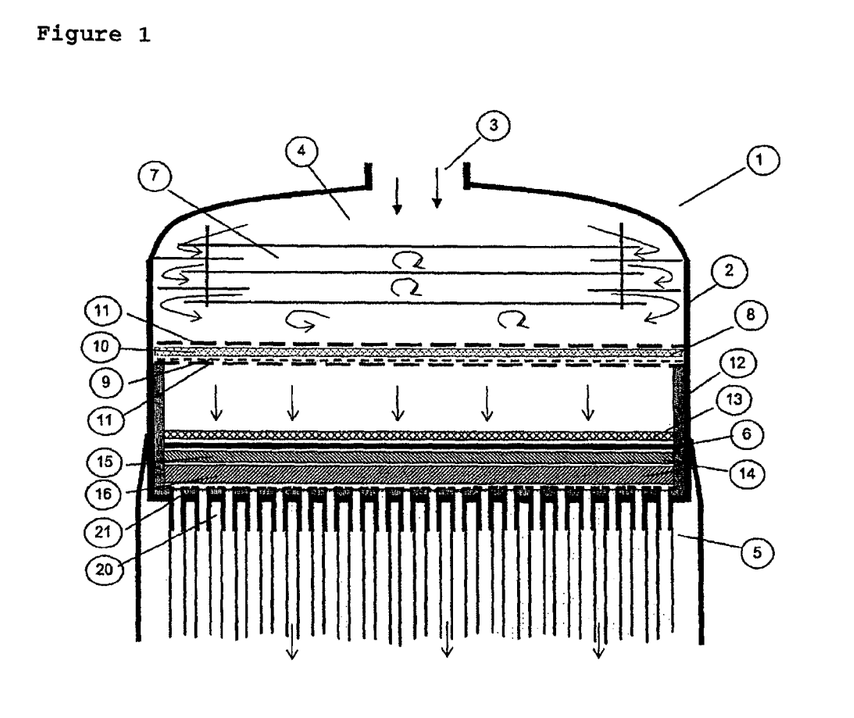
FIG. 1 shows a reactor according to one embodiment of the invention.

FIG. 1 details a preferred embodiment of an inventive reactor. The reactor (1) comprises a reactor vessel (2), a gas inlet (3) which opens into a gas inlet region (4), and an outlet of the reaction products (5). Between the gas inlet region (4) and the catalyst (6), a mixing element (7) and a gas-permeable intermediate layer (8) are provided. In this specific embodiment, the mixing element (7) is configured in a disc-donut design, alternating rings or discs being provided. The rings have orifices in the middle of the reactor and may be in contact with the reactor vessel.

The discs are envisaged as impervious plates, orifices being formed by an intermediate space between disc and reactor vessel.

The gas-permeable intermediate layer (8) comprises a metal mesh (9) which preferably has a mesh width in the range of 1 μm to 200 μm, more preferably 5 μm to 100 μm, and a sheet of glass wool (10) which may have, for example, a thickness in the range of 0.5 cm to 10 cm, preferably 1 cm to 5 cm. Perforated metal sheets (11) may be used to secure these elements, and the perforated sheets may have a hole diameter in the range of 1 mm to 100 mm, more preferably 5 mm to 40 mm.

In the present embodiment, the reactor vessel (2), viewed in flow direction of the gas, has an inner lining (12) composed of a heat-resistant material from the intermediate layer (8).

Once the gas has passed through the intermediate layer (8), the gas is contacted with the catalyst (6) which is configured in the form of a surface. The modification shown in FIG. 1 has a layer of a ceramic material (13) which has been placed directly on the catalyst (6) to secure it. In the embodiment shown, the catalyst (6) rests on a support (14) which is manufactured from ceramic in the present case. Appropriately, the ceramic support may have a two-layer structure, in which case the support (14) composed of ceramic comprises an upper ceramic support (15) and a lower ceramic support (16).

Subsequently, the reaction products are passed out of the reactor vessel through the outlet (5). The present embodiment comprises especially the tube bundles (20) which are configured in the form of heat exchangers, the tube bundles (20)

preferably being protected from the action of heat by ceramic elements, for example inserted sleeves (21), close to the reactor vessel.

Hereinafter, with reference to FIG. 2, a second embodiment of the reactor (1) is described, which is essentially similar to the first embodiment, such that merely the differences will be addressed, the same reference symbols being used for the same parts and the above description applying correspondingly.

Figure 2:
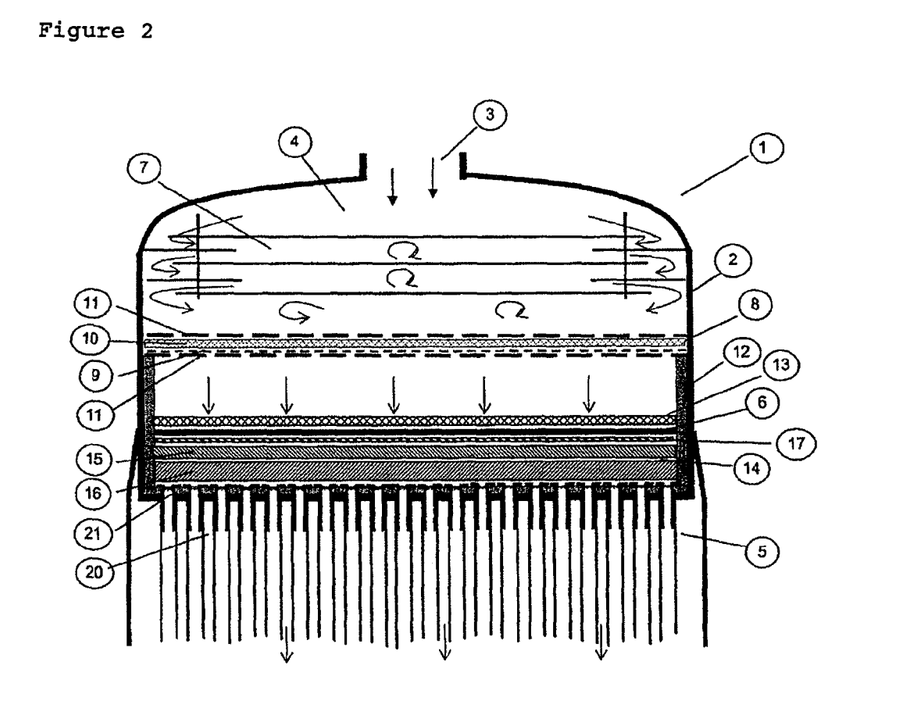
FIG. 2 shows a reactor according to another embodiment of the invention which includes a metal mesh between the catalyst and the ceramic support.

Like the first embodiment too, the reactor shown in FIG. 2 has a reactor vessel (2), a gas inlet (3) which opens into a gas inlet region (4), an outlet of the reaction products (5), a catalyst (6), a mixing element (7) and a gas-permeable intermediate layer (8).

In contrast to the above embodiment, the modification shown in FIG. 2 comprises a metal mesh (17) which has been provided between the catalyst (6) and the support (14) made from ceramic. As a result, it is surprisingly possible to enhance the effectiveness of the reactor.

Hereinafter, with reference to FIG. 3, a third embodiment of the reactor (1) is described, which corresponds essentially to the first embodiment, such that merely the differences will be addressed below, the same reference symbols being used for the same parts and the above description applying correspondingly.

Figure 3:
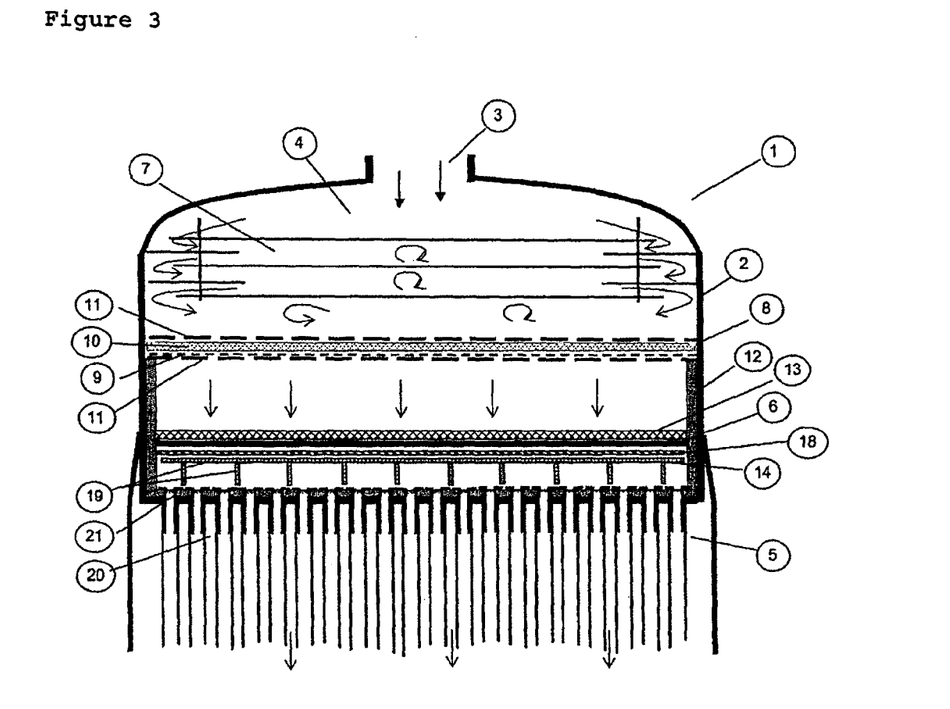
FIG. 3 shows a reactor according to another embodiment of the invention where a metal support is provided which includes a metallic support mesh.

Like the first embodiment too, the reactor shown in FIG. 3 also has a reactor vessel (2), a gas inlet (3) which opens into a gas inlet region (4), an outlet of the reaction products (5), a catalyst (6), a mixing element (7) and a gas-permeable intermediate layer (8).

In contrast to the embodiment shown in FIG. 1, the modification depicted in FIG. 3 comprises a support (14) which has been produced from metal. The support (14) made from metal comprises especially a metallic support mesh (18) supported by a support grid (19) made from metal. The support mesh (18) may have a mesh width in the range of 1 mm to 50 mm.

The support grid (19) rests with its feet on the ceramic elements (21) which protect the tube bundle (20) from the action of heat, or on the bottom of the tube bundles (20) which serve as heat exchangers. The distance between catalyst mesh (6) and the bottom of the tube bundle (20) may, for example, be 50 mm to 300 mm.

The reactor may be used especially for the preparation of hydrogen cyanide (HCN) by the Andrussow process. These processes are known per se and are described in detail in the prior art cited above.

To prepare HCN, preference is given to using a methane-containing gas. Typically, any gas having a sufficiently high content of methane can be used. The content of methane is preferably at least 80% by volume, more preferably at least 88% by volume. As well as methane, it is possible to use natural gas in the reactant gas. Natural gas is understood here to mean a gas which contains at least 82% by volume of methane.

In addition, to prepare HCN according to the Andrussow process, an oxygenous gas is used, for which oxygen or a nitrogen-oxygen mixture can be used. In this case, the proportion by volume of oxygen in relation to the total volume of nitrogen and oxygen ($O_2/(O_2+N_2)$) is in the range of 0.2 to 1.0 (vol./vol.). For example, air may be used as the oxygenous gas.

In a preferred aspect of the present invention, the proportion by volume of oxygen in relation to the total volume of nitrogen and oxygen ($O_2/(O_2+N_2)$) is in the range of 0.25 to 1.0 (vol./vol.). In a particular aspect, this proportion may preferably be in the range of greater than 0.4 to 1.0. In a further feature of the present invention, the proportion by volume of oxygen in relation to the total volume of nitrogen and oxygen ($O_2/(O_2+N_2)$) may be in the range of 0.25 to 0.4.

The molar ratio of methane to ammonia ($CH_4/NH_3$) in the reactant gas mixture may preferably be in the range of 0.95 to 1.05 mol/mol, more preferably in the range of 0.98 to 1.02.

The reaction temperature is preferably between 950° C. and 1200° C., preferably between 1000° C. and 1150° C. The reaction temperature can be adjusted via the proportion of the different gases in the reactant gas stream, for example via the ratio of $O_2/NH_3$. In this case, the composition of the reactant gas mixture is adjusted such that the reactant gas is outside the concentration range of ignitable mixtures. The temperature of the catalyst mesh is measured by means of a thermoelement or by means of a radiation pyrometer. The measurement point used for the radiation pyrometer is an open site on the glowing catalyst. For measurement with a thermoelement, the measurement point, viewed in flow direction of the gases, may be beyond the catalyst mesh at a distance of approx. 0-10 cm.

The molar ratio of oxygen to ammonia ($O_2/NH_3$) is preferably in the range of 0.7 to 1.25 (mol/mol).

The reactant mixture may preferably be preheated to a maximum of 150° C., more preferably a maximum of 120° C.

The flow rate with which the reactant gas is passed to the catalyst may be within a wide range. In a preferred modification of the process according to the invention, the reactant gas is passed to the catalyst at a rate in the range of 0.5 to 5 m/s, more preferably 0.8 to 2.5 m/s. The flow rate specified is based on the cross section of the reactor vessel and takes into account the operating conditions (pressure, temperature) of the reactant gas mixture which is passed to the catalyst. Since the cross section of the reactor can vary, these data are based on the average cross section of the reactor between the mixing element and the gas-permeable intermediate layer.

The present invention will be illustrated in detail hereinafter with reference to examples, without any intention that this should impose a restriction.

EXAMPLES

The results of the examples described below were found in an experimental apparatus consisting of a dosage unit with thermal mass flow controllers for the reactant gases used (methane, ammonia, air), an electrical heater for preheating the reactant gases to 100° C. and a reactor vessel with an internal diameter of 100 mm. In the reactor vessel, various internals were tested.

Example 1

The gas is supplied to the reactor vessel from the top. The feed orifice has a diameter of 25 mm. Below the feed region is a mixing element consisting of an alternating arrangement of discs and rings which are installed parallel to one another at a distance of 10 mm. The centrally fixed discs have a diameter of 93 mm. The free gap at the edge region is thus 3.5 mm. The rings fill the entire internal diameter (100 mm) and have a circular orifice in the middle with a diameter of 40 mm. In flow direction, the elements are arranged disc-ring-disc-ring-disc.

The mixing element is concluded by an edge deflector (guide plate) in the form of a 10 mm-wide ring.

Approx. 10 mm below the ring is installed a gas-permeable layer. This construction consists of two perforated metal sheets (external diameter 100 mm, hole diameter: 5 mm) between which a metal Dutch-woven fabric having a nominal mesh width of 80 μm and, above it, an approx. 6 mm-thick sheet of mineral wool are positioned.

At a distance of 30 mm below the gas-permeable layer, the catalyst consisting of 6 sheets of a Pt/Rh10 catalyst mesh (1024 meshes/cm, wire thickness 0.076 mm) is installed. The catalyst meshes are supported by a metallic support grid of mesh width 10 mm and wire thickness 2 mm, and are embedded in Nefalit sealant (Si-ceramic fibre mixture) in the edge region. The support grid rests on a ceramic support with flow channels of diameter 6 mm. Below the ceramic support, the reaction gas enters a tube bundle heat exchanger in which the reaction gas is cooled to approx. 200° C.

Example 2

As Example 1, except that the Pt mesh catalyst rests directly on the ceramic support without a metallic support grid.

Example 3

As Example 1, except with a mixing element in which, in flow direction, the elements are arranged disc-ring-disc.

Example 4

As Example 3, but with a mixing element consisting of 2 perforated metal sheets with a diameter of 100 mm and with holes of diameter 5 mm. The two perforated discs are arranged parallel to one another at a distance of 20 mm.

Comparative Example 1

As Example 4, but without mixing element. The gas mixture flowing in meets the gas-permeable layer directly.

Comparative Example 2

As Comparative Example 1, but without a gas-permeable layer. The gas mixture flowing in meets the catalyst meshes described directly.

Downstream of the reactor vessel, the reaction gas was cooled to approx. 200° C. in a tube bundle reactor and supplied to a downstream HCN scrubber for neutralization of the HCN formed with NaOH solution.

The reaction gas was analysed online in a GC. To assess the amount of HCN formed, the discharged NaCN solution was additionally weighed, and the CN content in the effluent of the HCN scrubber was determined by argentometric titration All experiments were performed with a constant reactant gas volume of approx. 25 m³/h (norm condition) and equal reactant gas compositions, and the air volume flow was approx. 18.2 m³/h (norm condition), the $NH_3$ volume flow approx. 3.35 m³/h (norm condition) and the methane volume flow approx. 3.27 m³/h (norm condition). The reactant gas temperature in all experiments was 100° C. Table 1 shows the results obtained.

TABLE 1

|  | HCN yield [kg/h] | HCN yield based on NH3 [%] | HCN yield based on methane [%] | HCN conc. in reaction gas [% by vol.] |
| --- | --- | --- | --- | --- |
| Example 1 | 2.76 | 67.8 | 69.9 | 7.81 |
| Example 2 | 2.67 | 65.8 | 67.6 | 7.63 |
| Example 3 | 2.58 | 64.67 | 65.46 | 7.40 |
| Example 4 | 2.61 | 64.25 | 65.42 | 7.15 |
| Comparative Example 1 | 2.37 | 58.69 | 59.95 | 6.43 |
| Comparative Example 2 | 2.11 | 52.41 | 53.86 | 5.77 |

The inventive embodiments of the reactor (Examples 1-4) show significantly better results with regard to the reactor performance and the yield. The higher HCN concentration in the reaction gas additionally enables an energetically more advantageous isolation of the HCN in the workup process.

The invention claimed is:

1. A reactor for preparing hydrogen cyanide by the Andrussow process, comprising in order of gas flow through the reactor:
   at least one gas inlet;
   a gas inlet region, comprising at least one mixing element having a plurality of plate layers;
   at least one gas-permeable intermediate layer;
   a catalyst layer; and
   an outlet for the reaction products;
   wherein
   the plurality of plate layers of the at least one mixing element are oriented substantially perpendicular to the inlet gas flow to create a turbulent gas flow,
   the at least one gas-permeable intermediate layer comprises at least one metal mesh arranged in the direction of the catalyst layer and a layer of glass wool which is arranged in the direction of the gas inlet region, and
   the at least one gas-permeable intermediate layer forms a pressure drop from the inlet side to the outlet side of the at least one gas-permeable intermediate layer.

2. The reactor according to claim 1, wherein the at least one mixing element comprises impervious plates which have an area which corresponds to at least 40% of a cross-sectional reactor area.

3. The reactor according to claim 1, wherein the at least one mixing element comprises at least 3 plate layers.

4. The reactor according to claim 3, wherein a distance of separation of the plate layers is 1 cm to 100 cm.

5. The reactor according to claim 1, wherein the catalyst layer is configured areally in the reactor, the area being arranged so that the area is flowed through by the gas at an angle in the range of 70 to 110° to the areal catalyst arrangement.

6. The reactor according to claim 5, wherein the catalyst arrangement comprises at least one metal mesh which comprises platinum.

7. The reactor according to claim 5, wherein an angle formed by the catalyst layer configured areally in the reactor and the plates which are present in the at least one mixing element is from −10° to +10°.

8. The reactor according to claim 1, wherein an angle formed by the at least one gas-permeable intermediate layer and the catalyst layer configured areally in the reactor is from −10° to +10°.

9. The reactor according to claim 1, wherein the at least one gas-permeable intermediate layer generates a pressure drop which is in the range of 5 to 100 mbar, measured by means of a U-tube manometer at a flow rate of the reactant gas mixture of 1.5 m/s.

10. The reactor according to claim 1, wherein a nominal mesh width of the at least one metal mesh arranged in the at least one gas-permeable intermediate layer is from 1 μm to 200 μm.

11. The reactor according to claim 10, wherein the nominal mesh width of the at least one metal mesh is from 5 μm to 100 μm.

12. The reactor according to claim 1, wherein the at least one metal mesh and the layer of glass wool are enclosed by two perforated sheets.

13. The reactor according to claim 1, wherein a distance between the at least one gas-permeable intermediate layer and the catalyst layer configured areally in the reactor is at least 30 mm.

14. The reactor according to claim 1, wherein the reactor vessel, viewed in a flow direction of the gas from the at least one gas-permeable intermediate layer comprises an inner lining of a heat-resistant material.

15. The reactor according to claim 1, further comprising a layer of a ceramic material applied directly to the catalyst layer.

16. The reactor according to claim 1, wherein the catalyst layer rests on a ceramic support.

17. The reactor according to claim 16, wherein the ceramic support comprises an upper ceramic support and a lower ceramic support.

18. The reactor according to claim 16, comprising a metal mesh between the catalyst layer and the ceramic support.

19. The reactor according to claim 1, wherein the catalyst layer rests on a support which comprises at least one metallic support mesh mounted on a support grid composed of metal.

20. The reactor according to claim 19, wherein a mesh width of the at least one metallic support mesh is from 1 mm to 50 mm.

21. The reactor according to claim 1, wherein the outlet of the reaction products comprises heat exchanger tube bundles.

22. The reactor according to claim 21, wherein the tube bundles comprise ceramic elements at an end closest to the catalyst layer to protect from the action of heat.

23. A process for preparing HCN by the Andrussow process, wherein the process is conducted in the reactor according to claim 1.

24. The process according to claim 23, wherein a temperature of the gas in the region of the at least one mixing element is at most 150° C.

* * * * *